US010462037B1

United States Patent
Ramabadran et al.

(10) Patent No.: US 10,462,037 B1
(45) Date of Patent: Oct. 29, 2019

(54) NETWORK DEVICE WITH TESTING OF FORWARDING RULES USING TUNNELING

(71) Applicant: Amazon Technologies, Inc., Seattle, WA (US)

(72) Inventors: Srinivasan Ramabadran, Sunnyvale, CA (US); Daniel Connor, Castlecomer (IE); Ezequiel Lara Gomez, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/020,844

(22) Filed: Jun. 27, 2018

(51) Int. Cl.
*H04L 12/26* (2006.01)
*H04L 12/741* (2013.01)
*H04L 12/46* (2006.01)
*H04L 29/12* (2006.01)
*H04L 12/70* (2013.01)

(52) U.S. Cl.
CPC .......... *H04L 43/50* (2013.01); *H04L 12/4633* (2013.01); *H04L 43/12* (2013.01); *H04L 45/745* (2013.01); *H04L 61/6022* (2013.01); *H04L 2012/5628* (2013.01); *H04L 2212/00* (2013.01)

(58) Field of Classification Search
CPC ... H04L 12/4633; H04L 43/12; H04L 45/745; H04L 61/6022; H04L 2012/5628; H04L 2212/00
See application file for complete search history.

(56) References Cited

U.S. PATENT DOCUMENTS

| 9,577,911 | B1* | 2/2017 | Castleman | .............. H04L 67/34 |
| 2019/0052556 | A1* | 2/2019 | Duda | .................. H04L 43/0817 |
| 2019/0182166 | A1* | 6/2019 | Ghazisaeedi | ........... H04L 47/22 |

OTHER PUBLICATIONS

Zeng et al., "Automatic Test Packet Generation," Proceedings of the 8th International Conference on Emerging Networking Experiments and Technologies, Dec. 2012, 12 pages.

* cited by examiner

*Primary Examiner* — Shukri Taha
(74) *Attorney, Agent, or Firm* — Klarquist Sparkman, LLP

(57) ABSTRACT

A network device is described that injects probes for exercising its own forwarding rules (e.g., layer 2 and layer 3). One or more probe packets can be injected into an ingress pipeline of the network device using the agent executing on a local processor. The probes are detected before or after performing at least layer 2 and layer 3 lookups. Hardware in switching logic redirects the probes to an external testing system in order to verify the actual forwarding behavior applied to the probe packet. In order to deliver the probes to the external server, the network device performs an additional layer 3 lookup and generates an encapsulated packet incorporating results of a lookup on the probe packet. In this way, the external server can analyze the lookup on the probe packet to determine whether the lookup was performed correctly.

20 Claims, 9 Drawing Sheets

NETWORK DEVICE WITH TESTING OF FORWARDING RULES USING TUNNELING

BACKGROUND

Network switches play a critical role in large computer networks, such as those found in a data center. Server computers in the network can be divided into racks, and network switches can connect the server computers within a rack to routers in the data center. Data passed by switches is generally divided into a series of packets that can be transmitted between devices. Packets include control information and payload data. The control information includes information used to deliver the payload data. For example, control information can include source and destination network addresses, error detection codes, packet sequencing identification, and the like. Typically, control information is found in packet headers and trailers included within the packet and adjacent to the payload data.

Generally, network switches have two primary planes: a control plane and a data plane. The control plane is a management plane that configures the data plane. The data plane receives packets on input ports and transmits the received packets to output ports based on the configuration. A forwarding table within the data plane controls which next hops receive the packets. Typically, the forwarding table is programmed in accordance with routing strategies, such as equal-cost multi-path routing (ECMP), which is a strategy where next-hop packet forwarding to a destination can occur over multiple best paths. ECMP is per-hop decision limited to a single router, and can be inefficient if routers in the network are not functioning.

Testing of network switches can be problematic. Typically, test probes are sent from a source host device through a network of switches to a destination host device. The probes are effective at testing the paths and links in the network, but not effective at testing forwarding rules of the network devices themselves.

DETAILED DESCRIPTION

A network device is described that injects probes for exercising its own forwarding rules (e.g., layer 2 and layer 3). One or more probe packets can be injected into an ingress pipeline of the network device using the agent executing on a local processor. The probes are detected before or after performing at least layer 2 and layer 3 lookups. Hardware in switching logic redirects the probes to an external testing system in order to verify the actual forwarding behavior applied to the probe packet. In order to deliver the probes to the external server, the network device performs an additional layer 3 lookup and generates an encapsulated packet incorporating results of a lookup on the probe packet. In this way, the external server can analyze the lookup on the probe packet to determine whether the lookup was performed correctly.

Figure 1:
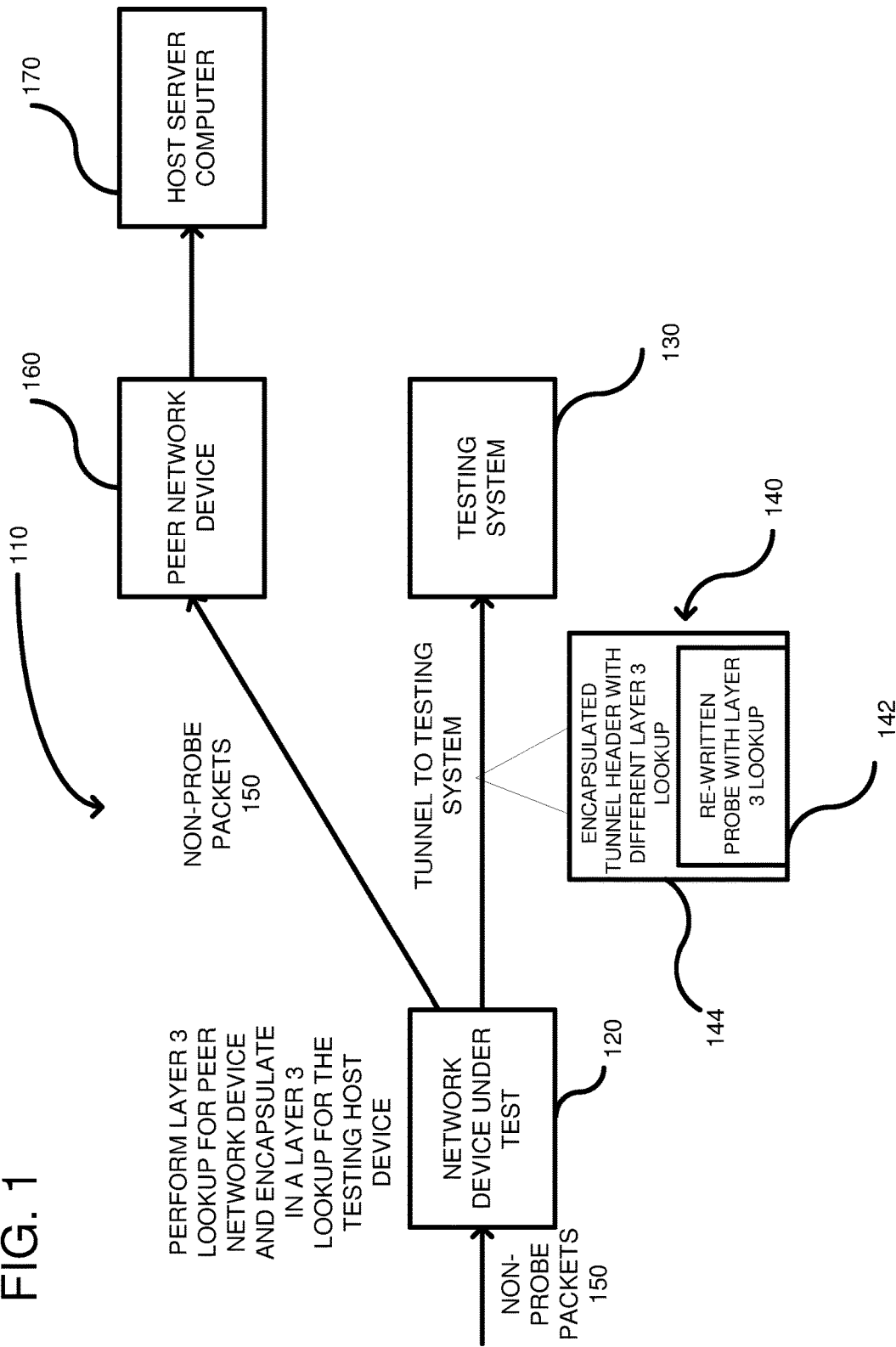
FIG. 1 is a system diagram showing a network device under test transmitting encapsulated probes to a testing system.

FIG. 1 shows a system 110 for testing a network device 120. The network device 120 can be any switch for forwarding packet data including, but not limited to, a router, a switch, a load balancer, a firewall, etc. As described further below, the network device 120 switches packets received on an input port and delivers the switched packets on an output port in accordance with layer 2 and layer 3 lookups. The network device 120 injects probes into a data plane and performs multiple layer 3 lookups for each probe. A first lookup tests a forwarding information base (FIB) by performing a layer 3 lookup on an IP address within the probe. A second lookup is performed to obtain proper routing of test results to a testing system 130. The testing system 130 can include a plurality of host server computers and associated load balancers to ensure multiple network devices being tested in parallel can transmit results to the testing system. In some embodiments, one of the plurality of host server computers can analyze the test results to determine whether or not the network device under test passed or failed. Based on the second lookup, a packet 140 can be sent from the network device under test 122 to the testing system 130. The packet 140 includes a test results portion 142 and a header portion 144. The test results portion 142 includes results of a layer 3 lookup of the IP address within the probe (i.e., the first lookup). The header portion 144 enables the packet 140 to be tunneled to the testing system 130. Both the first and second lookups can occur in a single pass (i.e., a single cycle) of the layer 3 hardware. The encapsulated header portion 144 of packet 140 can be accomplished using a variety of different protocols including Internet Protocol (IP), Generic Routing Encapsulation (GRE) or Virtual Extensible LAN (VXLAN).

Typically the network device under test 120 injects multiple probes into its data plane so as to test different entries within the FIB. The test results associated with these probes can all be sent in different packets to the testing system 130 for analysis. At a same time that the network device under test 120 is injecting probes, it can be receiving packets 150 which are unrelated to probes. Such packets 150 can include customer packets, which are routed in accordance with the FIB to network devices, such as peer network device 160, which can further forward the packets to other peer network devices (not shown) until the packets 150 reach their ultimate destination, such as host server computer 170.

Figure 2:
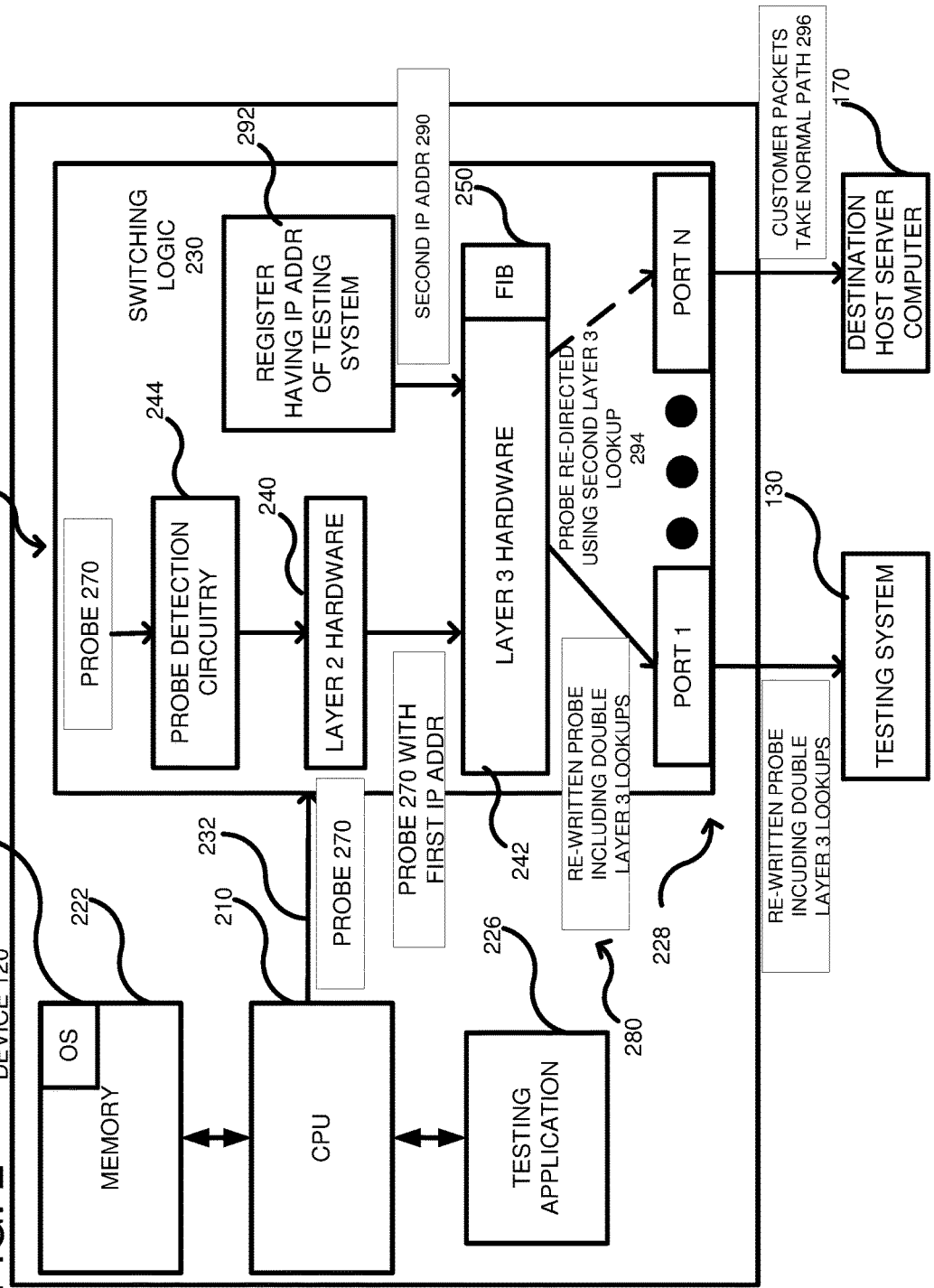
FIG. 2 is a hardware diagram of the network device of FIG. 1 that injects probe packets into switching logic for testing of the network device.

FIG. 2 shows further details of network device 120. In a normal mode of operation, the network device 120 is a switch that routes packets to a next hop in the network using a destination Internet Protocol (IP) address received on incoming packets. A CPU 210 is coupled to a memory 222, which stores an operating system 224 and other software (not shown). Although a CPU 210 is shown, any desired controller can be used including a general-purpose central processing unit (CPU), a processor in an application-specific integrated circuit (ASIC) or any other type of processor. The CPU is capable of executing the operating system 224 and one or more applications, such as a testing application 226. The CPU is further coupled to switching logic 230 through a bus 232 (PCIe or other protocols and bus types can be used). The switching logic 230 includes a plurality of ports 228, labeled 1 to N (where N is any integer number). The switching logic ports 228 can be coupled directly to ports (not shown) on the network device 120 that are typically adapted to receive network cables, such as Ethernet cables, for connection to other network devices or host server computers. The switching logic 230 can be a single ASIC integrated circuit (IC) or divided into multiple integrated circuits. Additionally, the switching logic 230 can include multiple different hardware logic blocks including a Layer 2 hardware block 240, a Layer 3 hardware block 242, and probe detection circuitry 244. Although not shown in this embodiment, the switching logic can further include an Access Control List (ACL) hardware block. The layer 2 hardware block 240 relates to an Ethernet layer and can forward packets based on Media Access Control (MAC) tables (not shown). The layer 3 hardware block 242 relates to forwarding based on a longest prefix match of an IP address. Layer 3 typically involves a route lookup, decrementing a Time-To-Live (TTL) count, calculating a checksum, and forwarding the frame with the appropriate Media Access Control (MAC) header to the correct output port. The route lookup of the layer 3 hardware can include searching within a Forwarding Information Base (FIB) 250, which includes destination addresses for packets being transmitted through the switching logic 230. The network device 230 can run routing protocols, such as an Open Shortest Path First (OSPF) or a Routing Information Protocol (RIP), to communicate with other layer 3 switches or routers. The routing tables are used to lookup the route for an incoming packet. In embodiments where an ACL block is used, the ACL block relates to permissions and can include rules whether to drop packets. The layer 2 hardware 240 and the layer 3 hardware 250 form an ingress pipeline. A probe detection circuitry 244 can be included in ingress pipeline at a desired position before or after the layer 2 hardware 240 and layer 3 hardware 242. In the illustrated embodiment, the probe detection logic 244 is positioned before the layer 2 hardware 240, and a flag can be set in a probe header to indicate to later logic that the packet is a probe. In alternative embodiments, the probe detection logic 244 can also be included in the ACL hardware. The probe detection logic 244 (described further below) is hardware logic used to differentiate test probes from customer traffic. The different hardware blocks can be coupled in series and additional hardware blocks can be added based on the design. Typical network packets pass from one of the ports 228 acting as an input port to one of the ports 228 acting as an output port after passing through the ingress pipeline, which decides which port is the output port and rewrites the packet to ensure the header is correct for receipt by a peer device.

As shown, the testing application 226 can be an agent executing on the CPU 210 and can be used to control testing of the network device 120 using a probe 270. The application 226 passes the probe to the CPU hardware 210 using the operating system 224 for transmitting the probe to the switching logic 230 via the bus 232. The probe 270 is then injected into an ingress pipeline of the switching logic as shown at 272, such that it passes through probe detection circuitry 244, Layer 2 hardware 240, and Layer 3 hardware 242. The probe 270 includes an appropriate MAC address that matches a MAC address of the network device 120 (to pass a layer 2 lookup) so that layer 3 switching occurs. Specifically, the probe includes a layer 2 header wherein the destination MAC address equals a MAC address of network device 120. The layer 2 hardware 240 checks to ensure a MAC address on the incoming packet matches the router's MAC address. If so, the layer 3 lookups can proceed. The probe packet 270 also includes a destination address that is an IP address (faux or real) within the layer 3 lookup tables (the FIB 250). More particularly, the layer 3 hardware 242 performs a lookup on a prefix of the probe 270 and determines a proper output port 228 that directs the probe packet 270 towards a peer network device. Alternatively, the probe 270 can have the full IP destination address (which includes the prefix) for lookup in the layer 3 hardware 242. In either case, the testing application ensures that the probe 270 includes a destination address (shown as a first IP address) that is found in the FIB so as to test the forwarding states of the switching logic 230. The probe is rewritten in a rewrite engine (not shown) that can be included in the layer 3 hardware or externally thereto to include a proper MAC address for whatever peer network device was determined in the layer 3 lookup. Additionally, the rewritten probe includes an identifier of what output port 228 (a first output port) was determined in the layer 3 lookup. The layer 3 hardware can further include logic for checking whether the probe 270 is a probe for testing (e.g., checking a flag in the probe set by the probe detection circuitry 244), and, if so, a second IP address 290 is received in the layer 3 hardware 242 from a register 292. The second IP address 290 can be used by the layer 3 hardware to perform a second lookup, either in parallel with the first lookup or in series with the first lookup. The first and second lookups can occur in a single pass through the layer 3 logic. In any case, the second IP address is an address that points to the testing system 130 (FIG. 1). The second lookup results in selection of a second output port, different from the first output port. The port selection is based on the port associated with the IP address in the FIB and, in some cases, can be the same port. The register 292 can be written to through a command line interface, through an API, etc. so that the switching logic 230 has the correct IP address associated with the testing system 130.

As shown at 280, both the first and second lookups are combined into a single rewritten probe. The results of the first lookup are used as a payload and the results of the second lookup are used as a header. Such a structure can be considered that the results of the first lookup are encapsulated in the results of the second lookup, as was shown at 140 in FIG. 1. Thus, the output port 228 determined in the first lookup is ignored in favor of the output port selected in the second lookup. In this way, the probe is redirected from its first lookup port to the second lookup port, as shown at 294. Customer packets that are not probes do not have a double lookup like probe packets. Instead, customer packets pass normally through the layer 2 and layer 3 hardware to the output port 228, as shown at 296.

The switching logic 230 can be considered a data plane of the network device 120. By contrast, the CPU 210, memory 222, and application 226 are considered part of a control plane. Although the register 292 is shown in the data plane, it can be positioned within the control plane.

Figure 3:
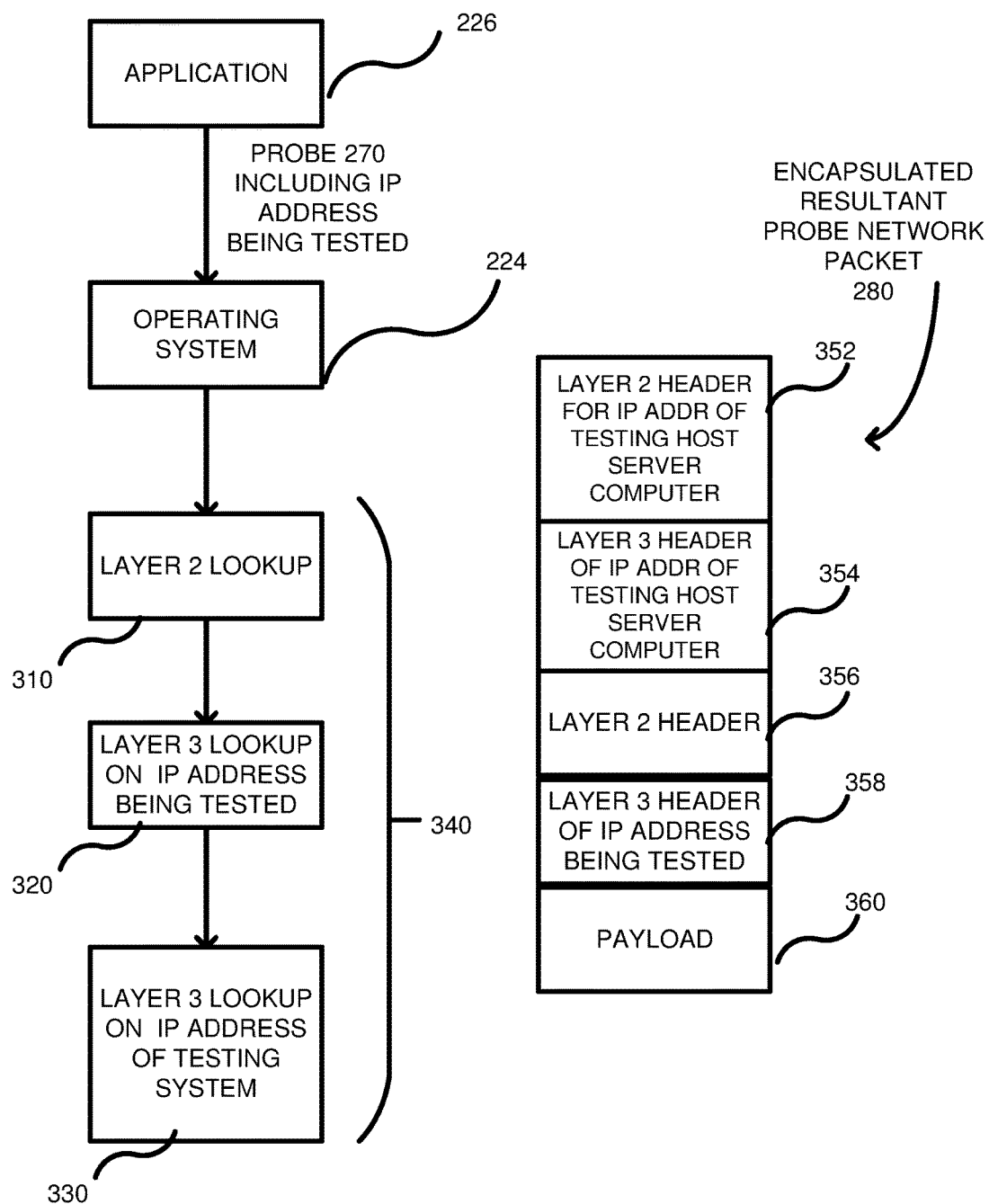
FIG. 3 is a diagram illustrating that the network device performs two layer 3 look ups to produce an encapsulated probe packet.

FIG. 3 shows further details of how the encapsulated packet 280 is generated. As shown at 226, the application generates a probe including an IP address to be tested in the FIB. The application 226 can pass the probe to the operating system 224, which can then transmit the probe to the switching logic 230. As shown at 310, a layer 2 lookup is performed to ensure that the probe 270 has a proper MAC address. If so, then the layer 3 lookups can proceed. Otherwise, the layer 3 lookups are bypassed. In the present case, after a single layer 2 lookup, two layer 3 lookups are performed. The first layer 3 lookup, shown at 320, is a lookup based on the IP address being tested. The lookup results in fields 356, 358, and 360 of the encapsulated packet 280. Specifically, field 356 is a header that has the appropriate MAC addresses for transmission to a peer network device based on layer 3 lookup 320. Field 358 is a header that includes other information (TTL, checksum, etc.) related to the layer 3 lookup for the IP address of the probe 270. Finally, a second layer 3 lookup 330 that is based on the IP address of the testing system 130 is performed. The result of lookup 330 is fields 352 and 354 of the encapsulated packet 280. Specifically, field 352 is a header that has the proper MAC addresses for a peer network device for transmitting the encapsulated packet 280 towards the testing system 130. The layer 3 lookup result 354 is a header based on the IP address of the testing host server computer. Together, the fields 352, 354, 356, 358, and 360 form a single packet wherein for fields 352 and 354, the remaining fields are considered payload. Thus, as shown at 340, the layer 3 lookup 320, and the second layer 3 lookup 330 are used to generate the encapsulated packet 280. It should also be noted that a single packet 270 through the switching hardware resulted in two separate layer 3 lookups on different destination IP addresses. Additionally, a port determined by the first layer 3 lookup result 320 is discarded in favor of the second layer 3 lookup 330 so as to redirect the packet to the testing system in cases where the packet is a test probe.

Figure 4:
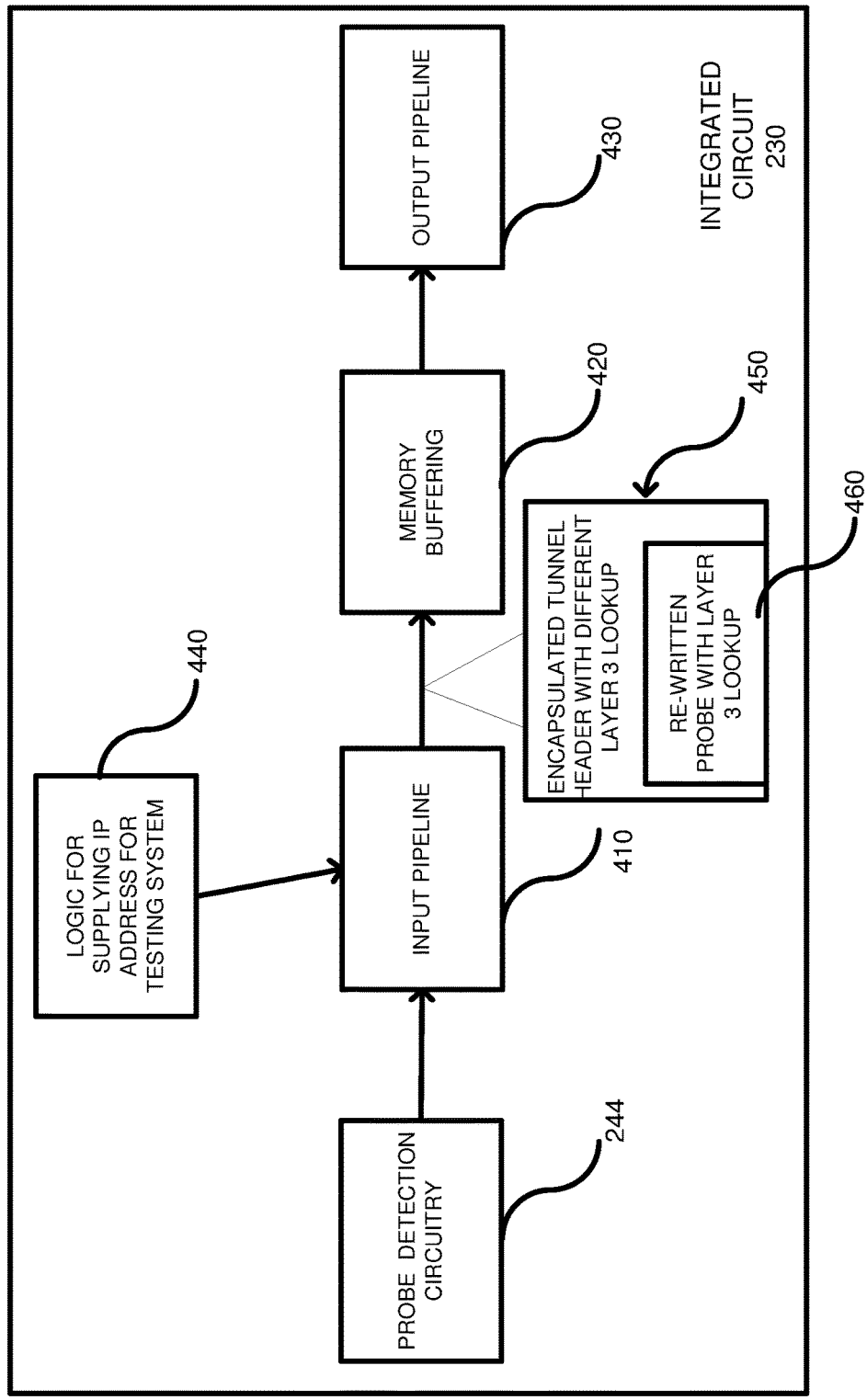
FIG. 4 is a diagram of an integrated circuit (IC) within the network device.

FIG. 4 shows further details of the switching logic 230. The switching logic 230 includes probe signature detection circuitry 244, an input pipeline 410, which can comprise layer 2 hardware, layer 3 hardware and ACL hardware. The switching logic 230 further includes memory buffering 420 coupled to the output of the input pipeline 410. The memory buffering is used to buffer packets prior to transmission on an output pipeline 430. As shown, the different circuit blocks 244, 410, 420, 430, and 440 are within a single integrated circuit 230, which is the switching logic. The probe detection circuitry 244 can analyze a combination of bits within a packet and can generate a trigger if the bits match a predetermined combination. In one example, bits within a packet's UDP header are used for determining a matching signature. If there is a match, in this embodiment, then logic 440 can be used to supply an IP address for the second lookup, wherein the IP address is a destination address of the host server computer that performs the testing. In some embodiments, the logic 440 can be a register within the control plane. In other embodiments, the logic 440 can be included in the integrated circuit 230. Additionally, in still other embodiments, the IP address from the logic 440 is used for all packets (probe or normal) and, if the packet is a normal packet, the second lookup is discarded. In the case of a match, the input pipeline 410 can perform two separate lookups for each probe. The first is based on an IP address being tested and is included in the probe. The second is an IP address of the testing server and is supplied by the logic 440. The two different lookups are included in a single packet shown at 450. The packet 450 includes a re-written probe 460 associated with the first lookup, which is then encapsulated within the packet 450 as payload for the second lookup. The resultant packet 450 can then be passed to the memory buffer 420 and passed to the output pipeline for transmission to the testing system 130.

Figure 5:
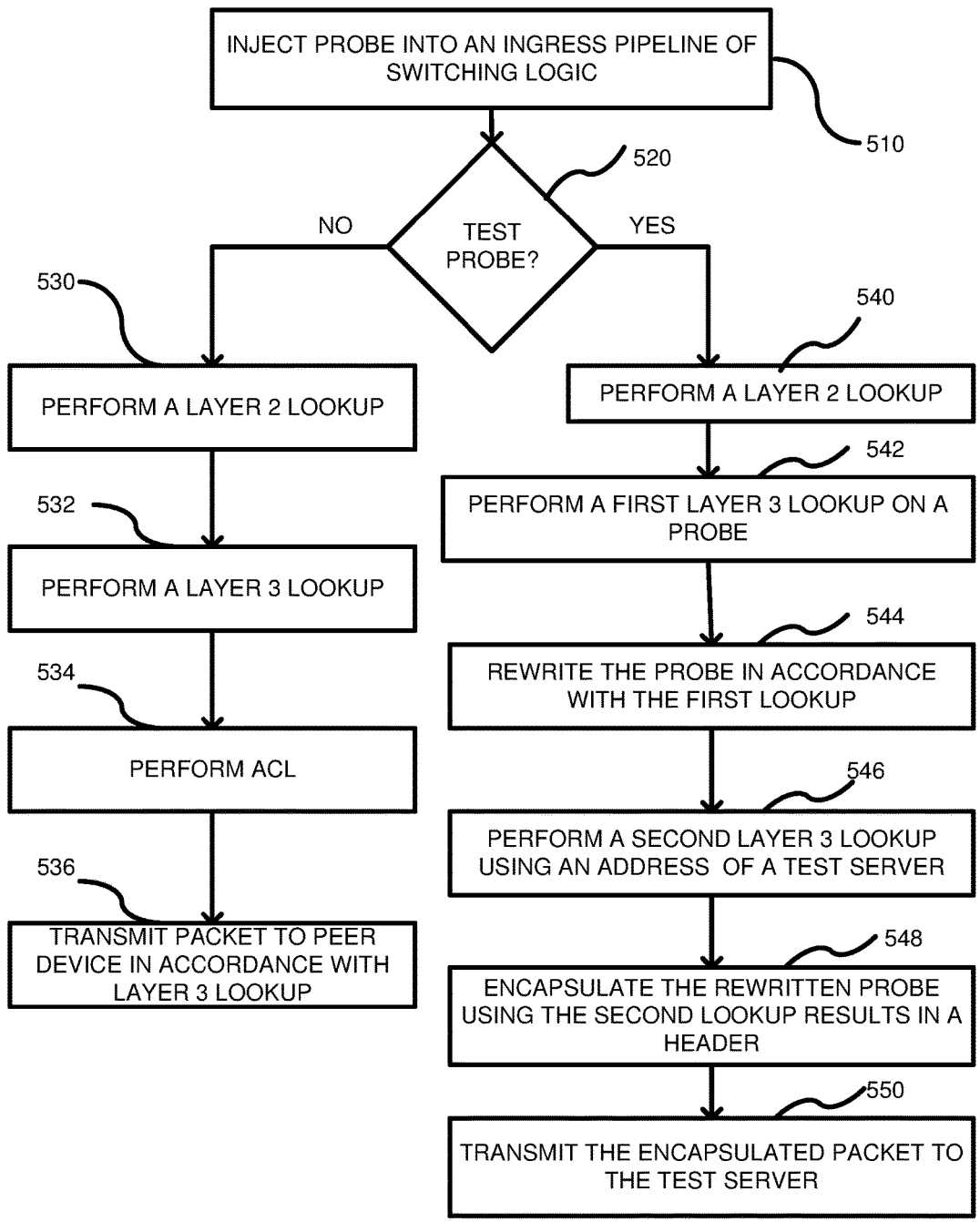
FIG. 5 is a detailed flowchart illustrating both customer packets and test probes processed by the network device.

FIG. 5 is a flowchart of an embodiment for testing forwarding rules in a network device. In process block 510, a probe is injected into an ingress pipeline of switching logic. For example, in FIG. 2, a testing application 226 injects a probe 270 into switching logic 230. In decision block 520, a check is made to determine whether the probe is a test probe or a packet associated with normal network traffic. If the packet is associated with normal network traffic, then in process block 530, a layer 2 lookup is performed in order to check that the MAC address is equal to the router's MAC. If so, then in process block 532, a layer 3 lookup is performed and the packet is rewritten in accordance with the layer 3 lookup. In process block 534, ACL hardware is performed to determine whether additional rules should be applied to the packet. Finally, in process block 536, the packet is transmitted to a peer device in accordance with the layer 3 lookup.

If, alternatively, the packet is a test probe, then decision block 520 is answered in the affirmative and the process continues to process block 540. In process block 540, a layer 2 lookup is performed to ensure that the test probe has a proper router MAC. In process block 542, a first layer 3 lookup is performed on the probe. In process block 544, the probe is rewritten in accordance with the first layer 3 lookup. For example, the appropriate port can be decided together with the appropriate layer 2 header to include with the probe. In process block 546, a second lookup is performed using an address of a test server. In process block 548, the probe is rewritten again to encapsulate the first rewritten probe into a second probe. An example encapsulated probe is shown at 280 in FIG. 3, wherein the layer 2 lookup 356 and layer 3 lookup 358 are included within the packet 280 as payload for the second lookup, which resulted in the layer 2 header 352 and the layer 3 header 354. In process block 550, the encapsulated probe can be transmitted to the test server.

Figure 6:
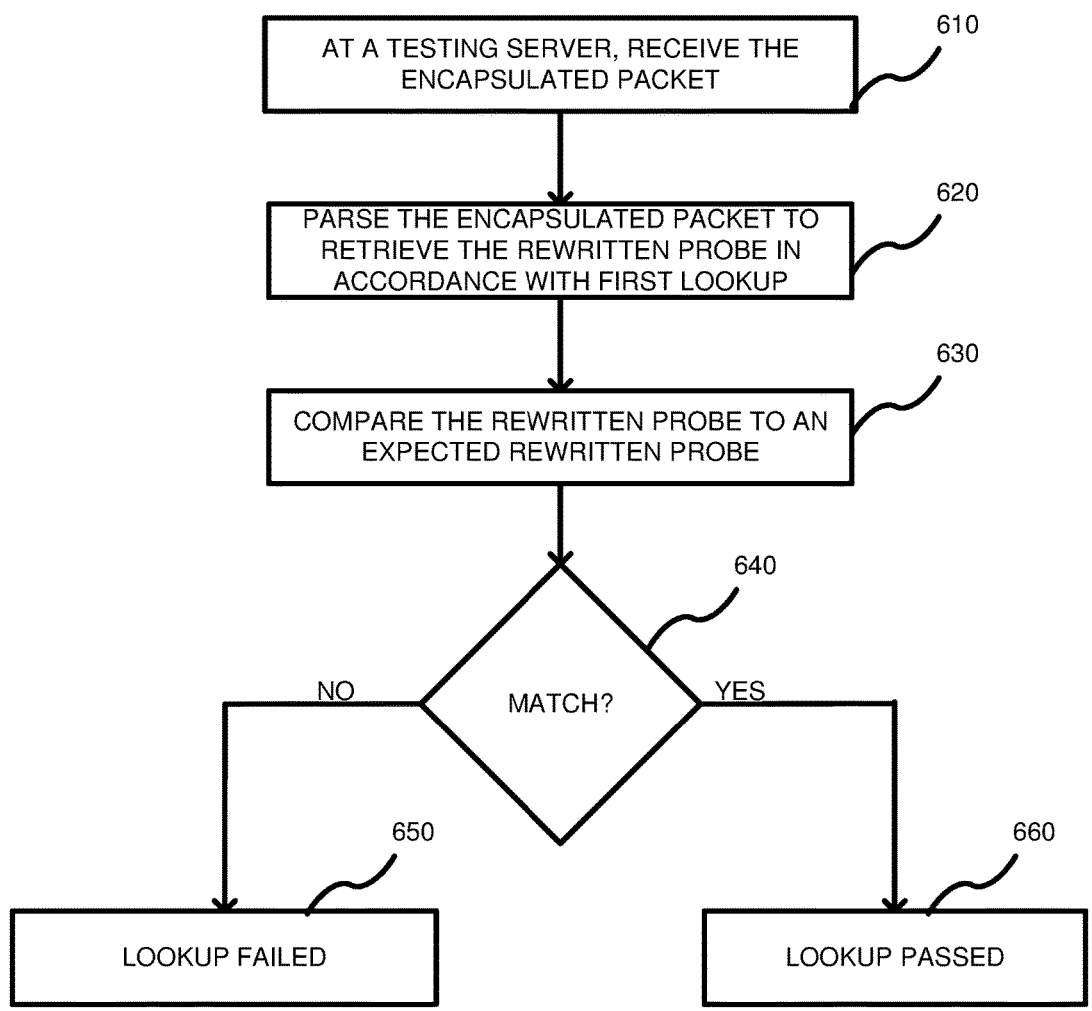
FIG. 6 is a flowchart illustrating the testing system of FIG. 1 determining whether the network device passed the test associated with a probe.

FIG. 6 is a flowchart according to one embodiment wherein a testing system analyzes the encapsulated probe. In process block 610, the testing server receives the encapsulated packet. For example, turning to FIG. 1, the testing system 130 receives the encapsulated packet 140 from the network device under test 120. In process block 620, the encapsulated packet is parsed by the testing system to retrieve the rewritten probe in accordance with the first lookup performed by the network device under test. For example, in FIG. 1, the rewritten probe 142 can be extracted from the encapsulated packet 140. As a result, the testing system 130 extracts the layer 2 lookup field 356, the layer 3 lookup field 358 and the payload 360 (FIG. 3). In process block 630, the rewritten probe extracted from the encapsulated packet is compared to an expected rewritten probe. In decision block 640, if the probes match then the first lookup passed the test (process block 660). Otherwise, when there is not a match, the lookup failed (process block 650). As a result, the testing system 130 can analyze lookups performed on the network device under test 120 to determine whether the forwarding rules in the network device under test are performing correctly. In order to obtain the information needed to test the encapsulated packet, the testing system 130 can query the network device under test for FIB data. The agent on the device under test can supply the necessary data for performing the test.

Figure 7:
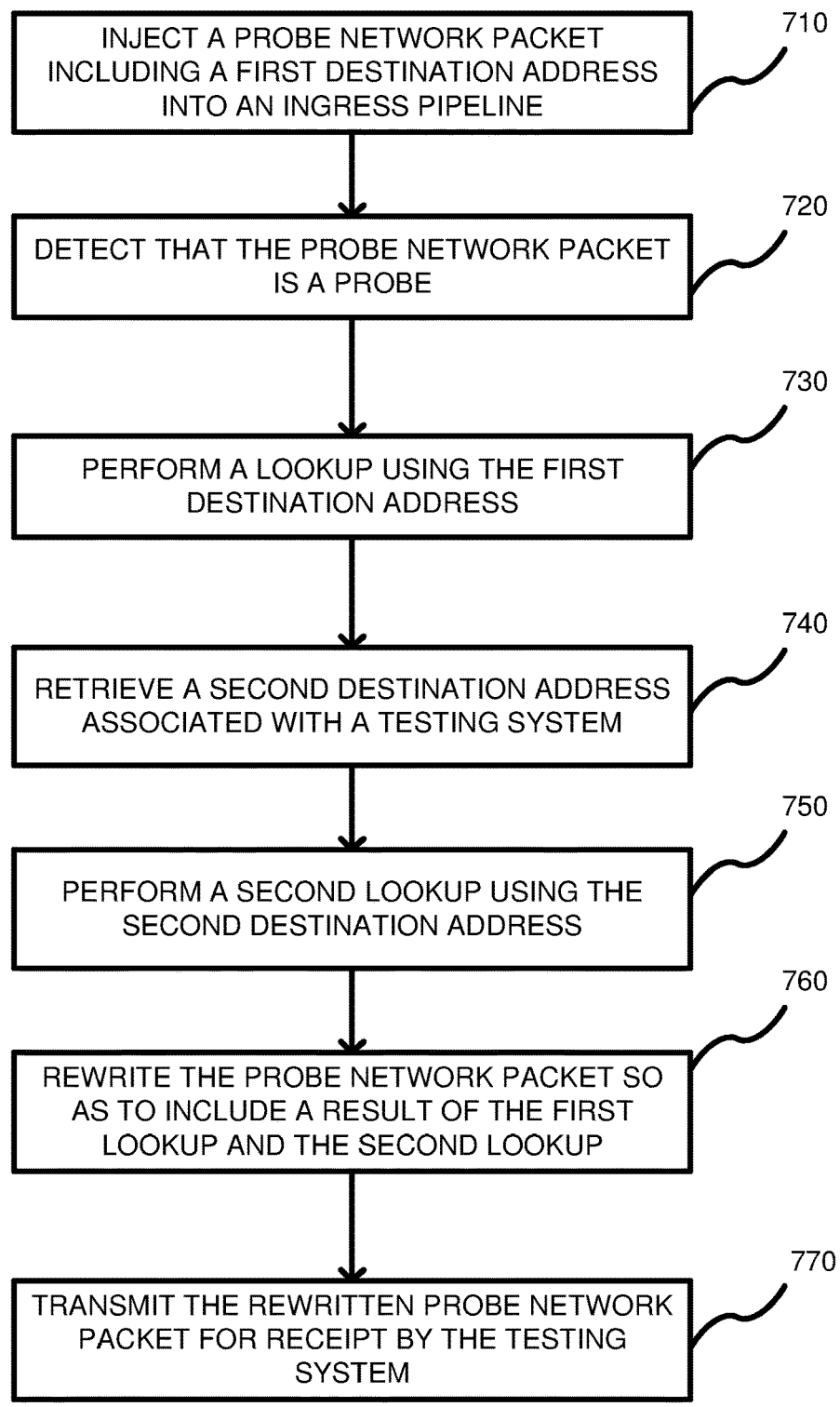
FIG. 7 is a flowchart according to one embodiment for testing forwarding rules in the network device.

FIG. 7 is a flowchart according to another embodiment for testing forwarding rules in a network device. In process block 710, a probe network packet is injected into an ingress pipeline wherein the probe network packet includes a first destination address. For example, turning to FIG. 2, the testing application 226 (also called an agent) executing on the CPU 210 injects the probe 270 into the switching logic 230. The testing application 226 includes in the probe 270 a destination address chosen so as to test the FIB 250. More particularly, the destination address is an IP address, which is one of the addresses within the FIB 250. In process block 720, a detection is made that the probe network packet is a probe for testing purposes, as opposed to normal network traffic passing through the network device. In FIG. 2, such a detection is made by the probe detection circuitry 244, which matches on a signature embedded within the probe 270. In one example, the signature can be within a UDP header, and the signature can be compared to a predetermined UDP header. In process block 730, a lookup is performed using the first destination address. For example, in FIG. 2, the layer 3 hardware 242 performs a first lookup using the destination address within the probe 270. The result of the lookup is that the layer 3 hardware 242 retrieves information needed to rewrite the probe including a MAC header and which port to transmit the probe on. In some embodiments, a layer 2 lookup is performed before the layer 3 lookup to ensure that the MAC address within the probe matches the router's MAC. Such a layer 2 lookup with MAC matching only needs to be done a single time for both layer 3 lookups. In process block 740, a second destination address is retrieved that is associated with a host server computer. Returning to FIG. 2, when the probe detection circuitry 244 identifies that the packet is a probe, the layer 3 hardware 242 retrieves an IP address from a register 292, wherein the IP address is an address of the testing system. In process block 750, a second lookup is performed using the second destination address. For example, the layer 3 hardware 242 uses the IP address from the register 292 in order to perform the layer 3 lookup. In process block 760, the probe network packet is rewritten so as to include a result of the first lookup and the second lookup. As shown at 280 in FIG. 2, the rewritten probe includes double layer 3 lookups. More specifically, as shown in FIG. 3 at 280, the encapsulated result includes both layer 2 and layer 3 lookup information in a single, combined packet. Typically, the first lookup information is included as payload for a header associated with this second lookup information so that the testing system can extract the payload in order to gather information about the first lookup for testing purposes. In process block 770, the rewritten probe is transmitted for receipt by the host server computer that is performing the testing. For example, in FIG. 1, the encapsulated packet 140 is passed to the testing system 130. In this case, the testing system 130 can be a tunnel end point associated with the second lookup. The host server computer can then test the encapsulated packet using a procedure such as was described in relation to FIG. 6.

Figure 8:
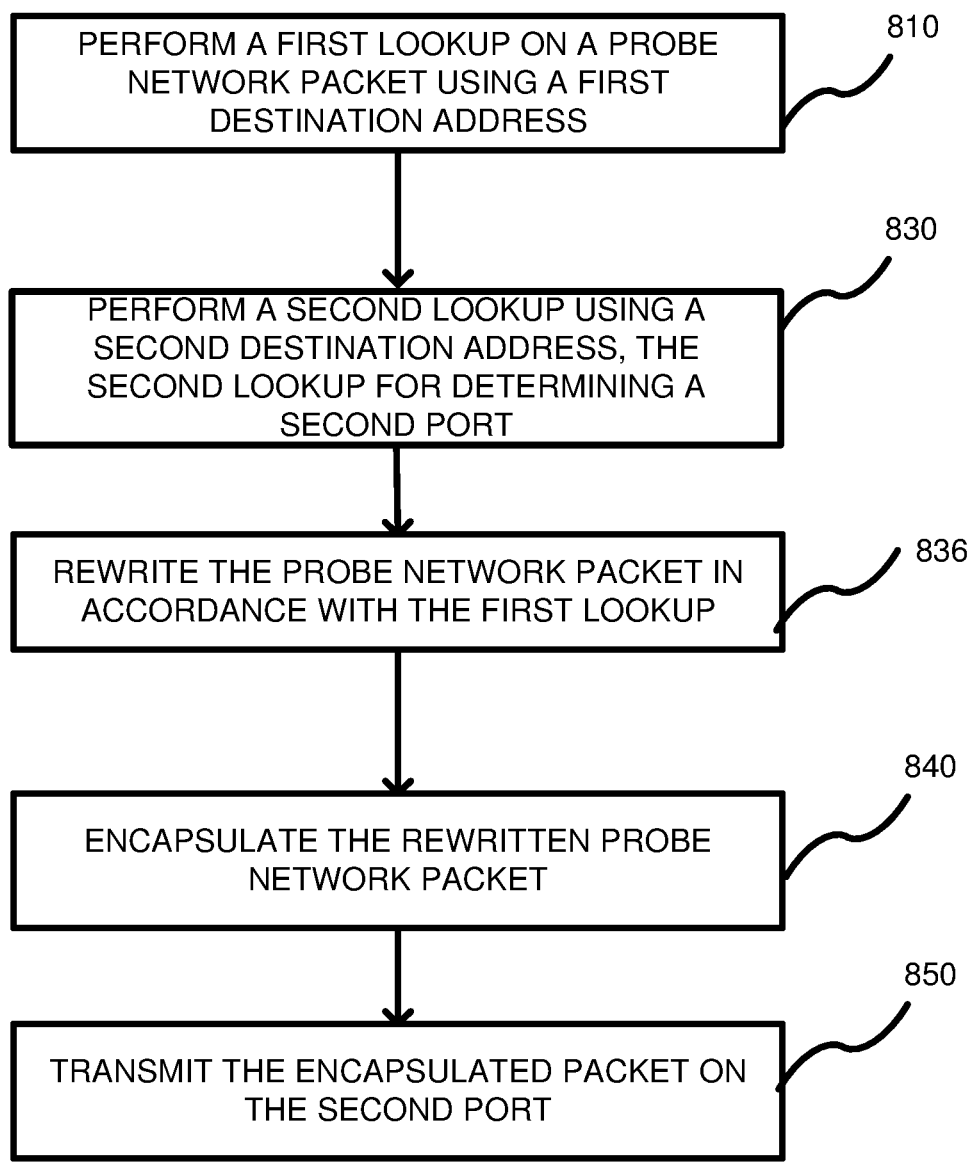
FIG. 8 is a flowchart according to another embodiment for testing forwarding rules in the network device.

FIG. 8 is a flowchart according to another embodiment for testing forwarding rules in a network device. In process block 810, a first lookup is performed on a probe network packet using a first destination address. For example, turning to FIG. 3, a first lookup 320 is performed on an IP address being tested. As shown in FIG. 3, the first lookup allows the network device under test to gather information for fields 356 and 358, which can be used in generation of the encapsulated result 280. It should be noted that the rewriting in accordance with the first lookup can occur after or before the second lookup. Consequently, the first and second lookup can both be performed and then the encapsulated result 280 generated at one time. Alternatively, some processing can be performed after the first lookup to rewrite the probe network packet prior to the second lookup. In any event, in process block 830 a second lookup is performed using a second destination address. The second destination address is used to determine a second port on which to transmit the encapsulated packet. In this case, the first port is ignored in favor of the second port. In other words, the encapsulated result is redirected from the first port to the second port for transmission to the host server computer and the first port is ignored or otherwise not used. In process block 836, the probe network packet is rewritten in accordance with the first lookup so as to transmit the probe network packet on a first port. In process block 840, the rewritten probe is encapsulated so as to include the information from the first lookup embedded within the encapsulated probe. In process block 850 the encapsulated packet is then transmitted on the second port. As a result, the testing system can receive the encapsulated packet, parse the encapsulated packet to unpack the rewritten probe network packet and compare the results of the first lookup against known results to determine whether the network device under test is performing correctly.

Figure 9:
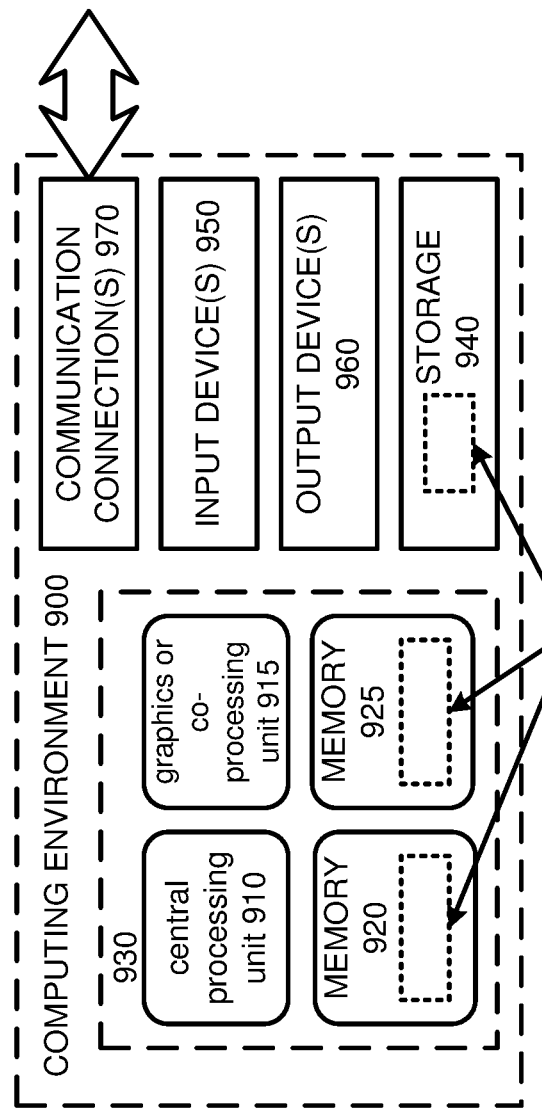
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.). As shown herein, components of FIG. 9 can be incorporated into the network device 120.

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of testing forwarding rules in a network device, comprising:
   injecting a probe network packet into an ingress pipeline of the network device using a controller on the network device, the probe network packet including a first destination address;
   detecting that the probe network packet is a test probe;
   performing a first lookup on the probe network packet, using the first destination address, in a Forwarding Information Base (FIB) within the network device so as to test the FIB on the network device;
   retrieving a second destination address of a testing system associated with testing the FIB;
   performing a second lookup in the FIB using the second destination address;
   rewriting the probe network packet so as to include a result of the first lookup and the second lookup in a combined probe network packet, wherein the rewriting of the probe network packet includes rewriting the result of the first lookup in the combined probe network packet with a header including a result of the second lookup; and
   transmitting the rewritten probe network packet for receipt by the testing system having the second destination address for testing the result of the first lookup.

2. The method of claim 1, wherein the injecting of the probe network packet is generated from an agent executing on the network device.

3. The method of claim 1, wherein the detecting includes matching a probe signature embedded within the probe network packet.

4. The method of claim 3, wherein the matching of the signature includes matching a User Datagram Protocol (UDP) header in the probe network packet to a predetermined UDP header.

5. The method of claim 1, wherein the first and second lookups are performed in a single pass through layer 3 hardware.

6. The method of claim 1, further including performing a single layer 2 lookup to ensure that the probe network packet has a Media Access Control (MAC) address that matches a MAC address of the network device prior to the first lookup in the FIB and the second lookup in the FIB.

7. A method, comprising:
- in a network device, performing a first lookup on a probe network packet using a first destination address, the first lookup for determining a first port on which to transmit the probe network packet;
- performing a second lookup using a second destination address associated with a testing system associated with testing the network device, the second lookup for determining a second port on which to transmit the probe network packet;
- rewriting the probe network packet in accordance with the first lookup;
- encapsulating the rewritten probe network packet using results of the second lookup to generate an encapsulated packet that includes the rewritten probe network packet; and
- transmitting the encapsulated packet on the second port.

8. The method of claim 7, further including receiving the probe network packet in the testing system, parsing the encapsulated packet to unpack the rewritten probe network packet, and comparing the rewritten probe network packet to an expected result for testing the first lookup.

9. The method of claim 7, wherein the probe network packet is not transmitted on the first port.

10. The method of claim 7, further including detecting that the probe network packet is a test probe by matching a signature within the probe network packet.

11. The method of claim 10, wherein the matching of the signature includes matching a User Datagram Protocol (UDP) header in the probe network packet to a predetermined UDP header.

12. The method of claim 7, wherein the first and second lookups are lookups in a Forwarding Information Base (FIB) and wherein the network device performs a single layer 2 lookup for checking a Media Access Control (MAC) address prior to performing the first and second lookups.

13. The method of claim 7, further including injecting the probe network packet into an ingress pipeline in the network device prior to the first lookup using a controller of the network device.

14. The method of claim 7, wherein the first and second destination addresses are Internet Protocol (IP) addresses testing systems.

15. An Integrated Circuit (IC), comprising:
- layer 3 circuitry for performing a lookup on a probe network packet for determining a first port to which the probe network packet is to be transmitted, wherein the layer 3 circuitry rewrites the probe network packet in accordance with the lookup;
- probe detection circuitry for determining that the probe network packet is a probe;
- circuitry for reading a register that stores a network address where test results are to be transmitted, the network address for use in a lookup in the layer 3 circuitry for determining a second port; and
- circuitry for encapsulating the rewritten probe network packet in a test results packet and for transmitting the test results packet on the second port.

16. The IC of claim 15, wherein the layer 3 circuitry is within an ingress pipeline and the ingress pipeline further includes layer 2 circuitry.

17. The IC of claim 15, further including multiple ports on which to transmit network packets, and wherein the circuitry for encapsulating ignores the port determination of the lookup on the probe network packet.

18. The IC of claim 15, wherein the network address where the test results are to be transmitted is an Internet Protocol (IP) address of a testing system that compares the rewritten probe network packet against an expected packet.

19. The IC of claim 15, wherein the IC is within a network device used for switching packets.

20. The IC of claim 15, wherein the lookup on the network address is disregarded if the probe detection circuitry determines that the probe network packet is not a probe.

* * * * *